(12) United States Patent
Gandolph et al.

(10) Patent No.: US 9,928,574 B2
(45) Date of Patent: Mar. 27, 2018

(54) METHOD AND APPARATUS FOR GENERATING SUPERPIXELS

(71) Applicant: THOMSON LICENSING, Issy de Moulineaux (FR)

(72) Inventors: Dirk Gandolph, Ronnenberg (DE); Joern Jachalsky, Wennigsen (DE); Wolfram Putzke-Roeming, Hildesheim (DE)

(73) Assignee: THOMPSON LICENSING SA, Issy les Moulineaux (FR)

( * ) Notice: Subject to any disclaimer, the term of this patent is extended or adjusted under 35 U.S.C. 154(b) by 61 days.

(21) Appl. No.: 14/542,899

(22) Filed: Nov. 17, 2014

(65) Prior Publication Data

US 2015/0138191 A1    May 21, 2015

(30) Foreign Application Priority Data

Nov. 19, 2013   (EP) .................................... 13306579

(51) Int. Cl.
*G06T 5/00*    (2006.01)
*G06T 7/00*    (2017.01)
(Continued)

(52) U.S. Cl.
CPC .................. *G06T 5/00* (2013.01); *G06T 7/11* (2017.01); *G06T 7/194* (2017.01); *G06T 11/00* (2013.01);
(Continued)

(58) Field of Classification Search
CPC .......... G06T 11/00; G06T 2207/10016; G06T 2207/20012; G06T 2207/20144;
(Continued)

(56) References Cited

U.S. PATENT DOCUMENTS 6,130,964 A      10/2000  Marques et al.
2010/0150232 A1*  6/2010  Nguyen ............ H04N 21/2389
                                              375/240.12

(Continued)

FOREIGN PATENT DOCUMENTS

CN         102637253      8/2012
EP           2680226      1/2014

OTHER PUBLICATIONS

Kihwan Kim, Dongryeol Lee and Irfan Essa, "Detecting Regions of Interest in Dynamic Scenes with Camera Motions," Computer Vision and Pattern Recognition (CPPR), 2012 IEEE Conference on Jun. 16-21, 2012.*

(Continued)

*Primary Examiner* — Sing-Wai Wu
(74) *Attorney, Agent, or Firm* — Tutunjian & Bitetto, P.C.

(57) ABSTRACT

A method and an apparatus for generating superpixels for a sequence of images are described. A segmenter segments an image of the sequence of images into a set of initial superpixels. A motion analyzer then determines static and non-static areas in the sequence of images. Based on an output of the motion analyzer the segmenter generates updated superpixels for non-static areas of the sequence of images, and maintains those superpixels of the set of initial superpixels belonging to static areas of the sequence of images.

18 Claims, 6 Drawing Sheets

(51) Int. Cl.
- *G06T 7/20* (2017.01)
- *G06T 11/00* (2006.01)
- *G06T 7/11* (2017.01)
- *G06T 7/194* (2017.01)

(52) U.S. Cl.
CPC ............... *G06T 2207/10016* (2013.01); *G06T 2207/20012* (2013.01); *G06T 2207/20156* (2013.01)

(58) Field of Classification Search
CPC ............. G06T 2207/20156; G06T 5/00; G06T 7/0081; G06T 7/2033
See application file for complete search history.

(56) References Cited

U.S. PATENT DOCUMENTS

| | | | |
|---|---|---|---|
| 2012/0201460 A1 | 8/2012 | Seo | |
| 2013/0027523 A1* | 1/2013 | Girdzijauskas | H04N 13/0022 348/48 |
| 2013/0201404 A1* | 8/2013 | Lu | H04N 5/142 348/699 |

OTHER PUBLICATIONS

Yu Liu, Wei Zhou, Huagang Yin and Nenghai Yu, "Tracking Based on Surf and Superpixel," 2011 Sixth Internation Conference on Image and Graphics, Conference on Aug. 12-15, 2011.*

Jachalsky et al: "D4.2.1 Scene Analysis with Spatio-temporal consistency", Internet Citation, Feb. 6, 2013 (Feb. 6, 2013); Section 3.1.1.

Levinshtein et al: "Optimal Image and Video Closure by Superpixel Grouping", International Journal of Computer Vision, vol. 100, No. 1, May 4, 2012 (May 4, 2012), pp. 99-119.

Tian et al: "3D spatio-temporal graph cuts for video objectssegmentation",Image Processing (ICIP), 18th IEEE Int'l Conf; Sep. 11, 2011, pp. 2393-2396.

Wang et al: "Superpixel tracking",Computer Vision (ICCV), 2011 IEEE, Int'l Conf., Nov. 6, 2011, pp. 1323-1330.

Achanta et.al.: "SLIC Superpixels Compared to State-of-the-Art Superpixel Methods"; IEEE Transactions on Pattern Analysis and Machine Intelligence, vol. 43 No. 11; Nov. 2012; pp. 2274-2262.

Gkamas et al.: Guiding optical flow estimation using superpixels; Publication Date : 2011; IIEEE 17th International Conference on Digital Signa Processing (DSP 2011); pp. 1-6.

Retrieval Date: Apr. 9, 2014; Research project Scene—"Novel representations for digital media beyond sample based (video) or model-based (graphics)"; http://3d-scene.eu/index.htm; 1 pg. only.

Ren et al.: "gSLIC: a real-time implementation of SLIC superpixel"; Technical Report University of Oxford, Department of Engineering Science; 2011; pp. 1-6.

Vazquez-Reina et al.: Multiple hypothesis video segmentation from superpixel flows; 2010; ECCV 2010. Proceedings 11th European Conference on Computer Vision; pp. 268-281.

Search Report dated Mar. 28, 2014.

* cited by examiner

METHOD AND APPARATUS FOR GENERATING SUPERPIXELS

This application claims the benefit, under 35 U.S.C. § 119 of European Patent Application No. 13306579.7, filed Nov. 19, 2013.

FIELD OF THE INVENTION

The invention relates to a method and an apparatus for generating superpixels, and more specifically to a method and an apparatus for generating superpixels that are spatially and temporally stable.

BACKGROUND OF THE INVENTION

Today there is a trend to create and deliver richer media experiences to consumers. In order to go beyond the ability of either sample based (video) or model-based (CGI) methods novel representations for digital media are required. One such media representation is SCENE media representation (http://3d-scene.eu). Therefore, tools need to be developed for the generation of such media representations, which provide the capturing of 3D video being seamlessly combined with CGI.

The SCENE media representation will allow the manipulation and delivery of SCENE media to either 2D or 3D platforms, in either linear or interactive form, by enhancing the whole chain of multidimensional media production. Special focus is on spatio-temporal consistent scene representations. The project also evaluates the possibilities for standardizing a SCENE Representation Architecture (SRA).

A fundamental tool used for establishing the SCENE media representation is the deployment of over-segmentation on video. See, for example, R. Achanta et al.: "*SLIC Superpixels Compared to State-of-the-Art Superpixel Methods*", IEEE Transactions on Pattern Analysis and Machine Intelligence, Vol. 43 (2012), pp. 2274-2282. The generated segments, also known as superpixels or patches, help to generate metadata representing a higher abstraction layer, which is beyond pure object detection. Subsequent processing steps applied to the generated superpixels allow the description of objects in the video scene and are thus closely linked to the model-based CGI representation.

A new aspect of the required over-segmentation is a spatio-temporal consistent segmentation. Known approaches on a spatio-temporal consistent over-segmentation are based on graph-cut methods, which have the disadvantage of being costly and time-consuming. See, for example, Z. Tian et al.: "*3D Spatio-temporal Graph Cuts for Video Objects Segmentation*", Proceedings of the International Conference on Image Processing (ICIP) (2011), pp. 2393-2396. Newer research on over-segmentation algorithms indicates the SLIC (Simple Linear Iterative Clustering) algorithm described by R. Achanta et al. as a perfect candidate to start with. It combines the advantages of a reliable segmentation result with its ability to be applicable in real-time. As the SLIC method has been originally developed for single image processing further adaptation work is required to cope with image sequences in movies, where a spatio-temporal consistent superpixel representation is essential.

A known solution is the usage of inter frame motion information to provide spatio-temporal consistent superpixels with the SLIC method. Instead of permanently positioning the seed points for the SLIC algorithm at the same location over the whole image sequence, the application of motion information allows a seed point positioning along the motion trajectory estimated from frame to frame. This is described in European Patent Application EP 13171832.2. Applying this seeding strategy generates superpixels which follow the optical flow and thus allows a tracking of moving objects in the scene, which may consist of one or more superpixels. The benefit is that the objects in a movie are constantly assigned to unique superpixels, which makes tracking very simple.

SUMMARY OF THE INVENTION

It is thus an object of the present invention to propose a solution for generating superpixels that are spatially and temporally stable.

According to the invention, a method for generating superpixels for a sequence of images comprises:
- segmenting an image of the sequence of images into a set of initial superpixels;
- determining static and non-static areas in the sequence of images;
- generating updated superpixels for non-static areas of the sequence of images; and
- maintaining those superpixels of the set of initial superpixels belonging to static areas of the sequence of images.

Accordingly, an apparatus configured to generate superpixels for a sequence of images, the apparatus comprising:
- a motion analyzer configured to determine static and non-static areas in the sequence of images; and
- a segmenter configured to segment an image of the sequence of images into a set of initial superpixels, generate updated superpixels for non-static areas of the sequence of images, and maintain those superpixels of the set of initial superpixels belonging to static areas of the sequence of images.

Similarly, a computer readable storage medium has stored therein instructions enabling generating superpixels for a sequence of images, which when executed by a computer, cause the computer to:
- segment an image of the sequence of images into a set of initial superpixels;
- determine static and non-static areas in the sequence of images;
- generate updated superpixels for non-static areas of the sequence of images; and
- maintain those superpixels of the set of initial superpixels belonging to static areas of the sequence of images.

It is proposed to freeze the segmentation algorithm within the image areas detected as being static. The non-static areas are segmented as before to track superpixels belonging to moving objects. This results in a freeze for superpixel positions and shapes belonging to static scene areas. More specifically, alterations in the seed point positions are prevented for the static image areas. In this way the non-moving superpixel segments belonging to static scene areas are stabilized and the exploitation of the abstraction layer is improved for applications like VFX (visual effects) by combining CGI generated with camera generated movie components.

With the above mentioned known solution the SLIC seed point positions are permanently altered due to the noise error in the motion estimation, which causes a pseudo motion for superpixels within the range of the static image areas. This breaks the model of the abstract layer, which assumes that superpixels are assigned to objects in the scene. As such, if the objects do not move, the assigned superpixels must not move, either. In addition, a further undesirable effect of the permanent seed point changes is a steady modification of the shapes of superpixels. This occasionally leads to shape oscillations, making the object identification impossible and causing a dissociation of superpixels and scene objects. Pseudo motion and shape oscillation of superpixels violate the underlying model of the abstraction layer.

The proposed solution removes or at least extenuates the above described effects. As such, it generally improves the over-segmentation results representing the abstract layer of the new SCENE media representation for digital media. The superpixels assignment to scene objects becomes more reliable and allows a precise distinguishing between moving and static objects in the scene. Exploiting the more accurate superpixel segmentation generates higher qualities for object tracking and VFX applications.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

The proposed solution applies a temporally-consistent SLIC (SLIC: Simple Linear Iterative Clustering) or another clustering based over-segmentation algorithm while distinguishing between moving and static image areas.

In the following first the mode of action for the clustering based over-segmentation algorithm running without the distinction between moving and static image areas shall be briefly described. The clustering based segmentation starts with single seed point pixels in an image and iteratively clusters similar and adjacent pixels by forming superpixels. The final result is a map of superpixels covering the image. A second component used for the over-segmentation with spatio-temporal consistency is the incorporation of motion information. The positioning of seed points in subsequent images is not kept constant, but is modified by exploiting the motion vectors calculated from the old to the new image in the image sequence. The subsequent seed points are set by following the estimated motion vectors into the new image. This allows the tracking of moving objects and in fact provides the spatio-temporal character of the over-segmentation.

Figure 1:
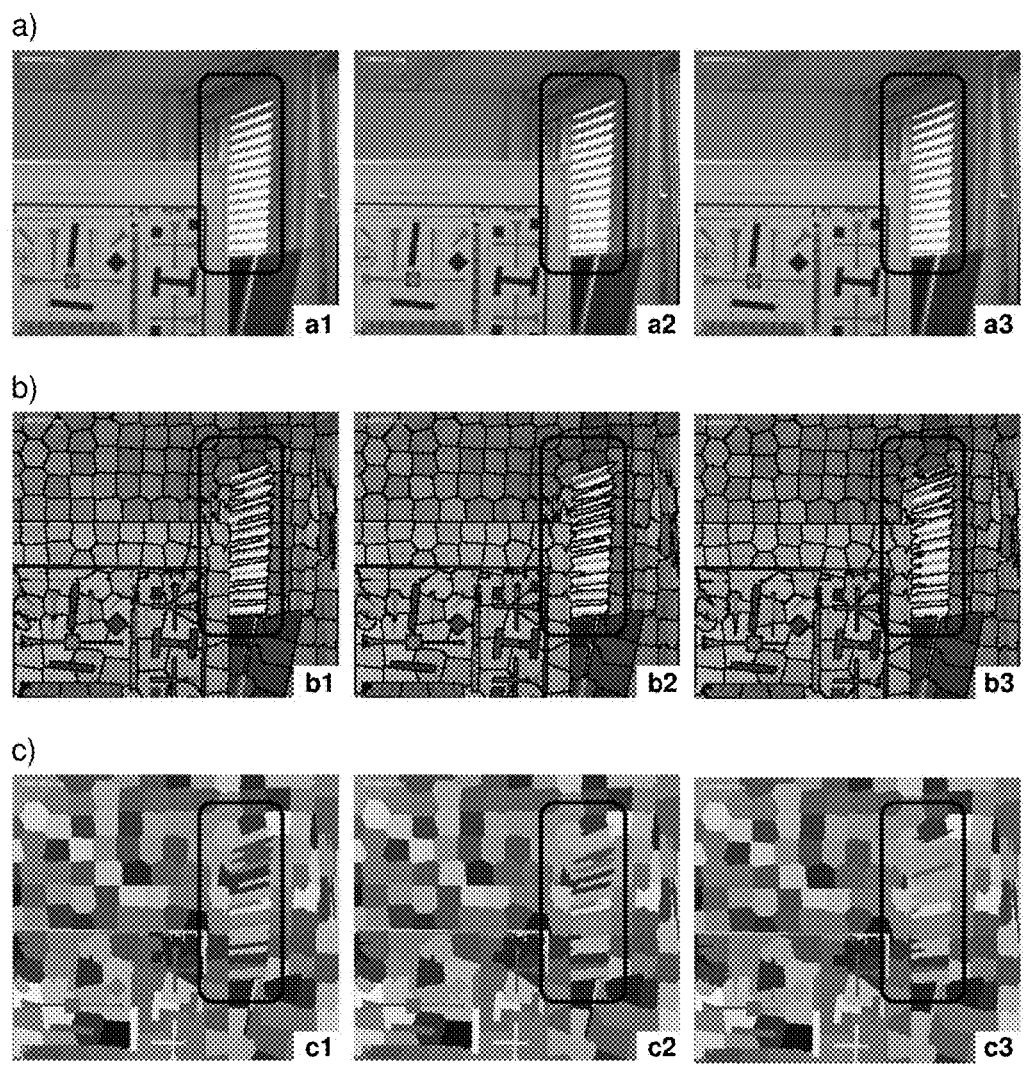
FIG. 1 depicts segmentation results for an image sequence containing static background only.
Figure 3:
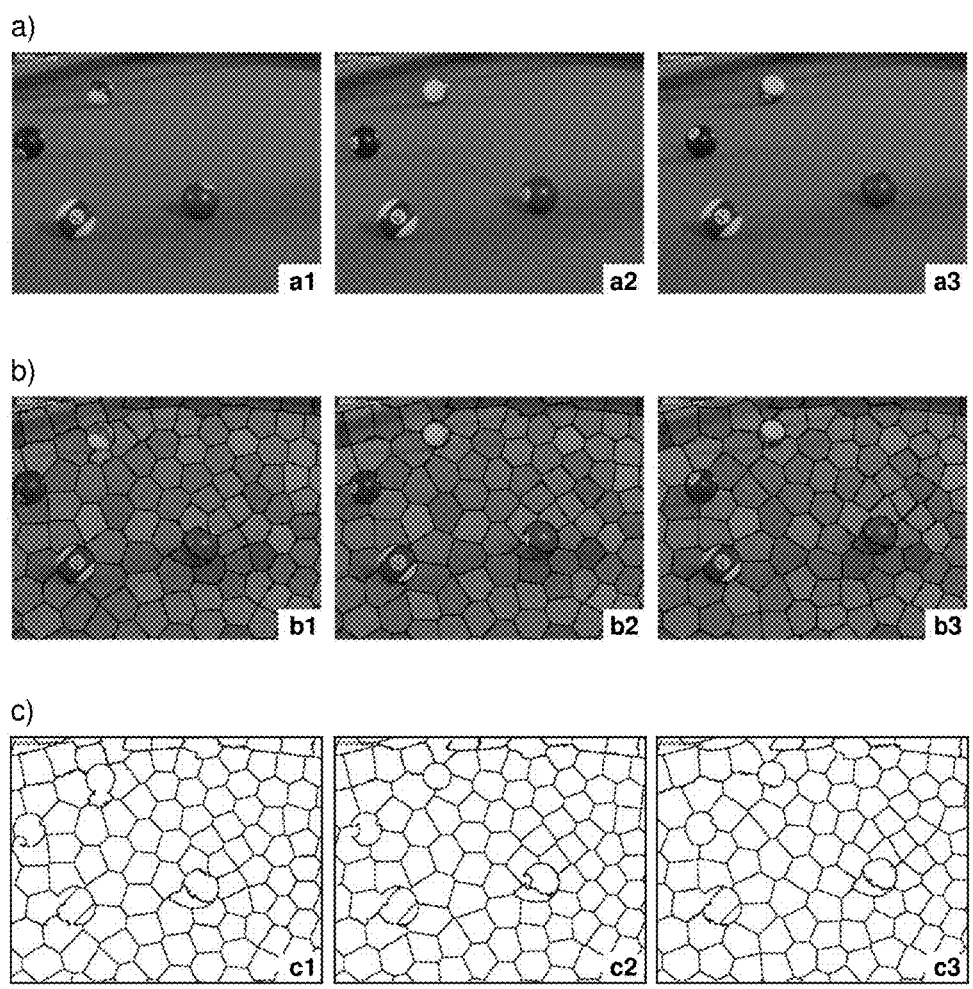
FIG. 3 depicts segmentation results for an image sequence containing static and dynamic image areas.

FIG. 1 and FIG. 3 depict segmentation results for a sequence of three images. The rows a, b, and c show the original images, the overlay with superpixels, and the superpixels alone, respectively. While FIG. 1 depicts an image sequence containing static background only, FIG. 3 depicts a sequence containing static and dynamic image areas.

Figure 2:
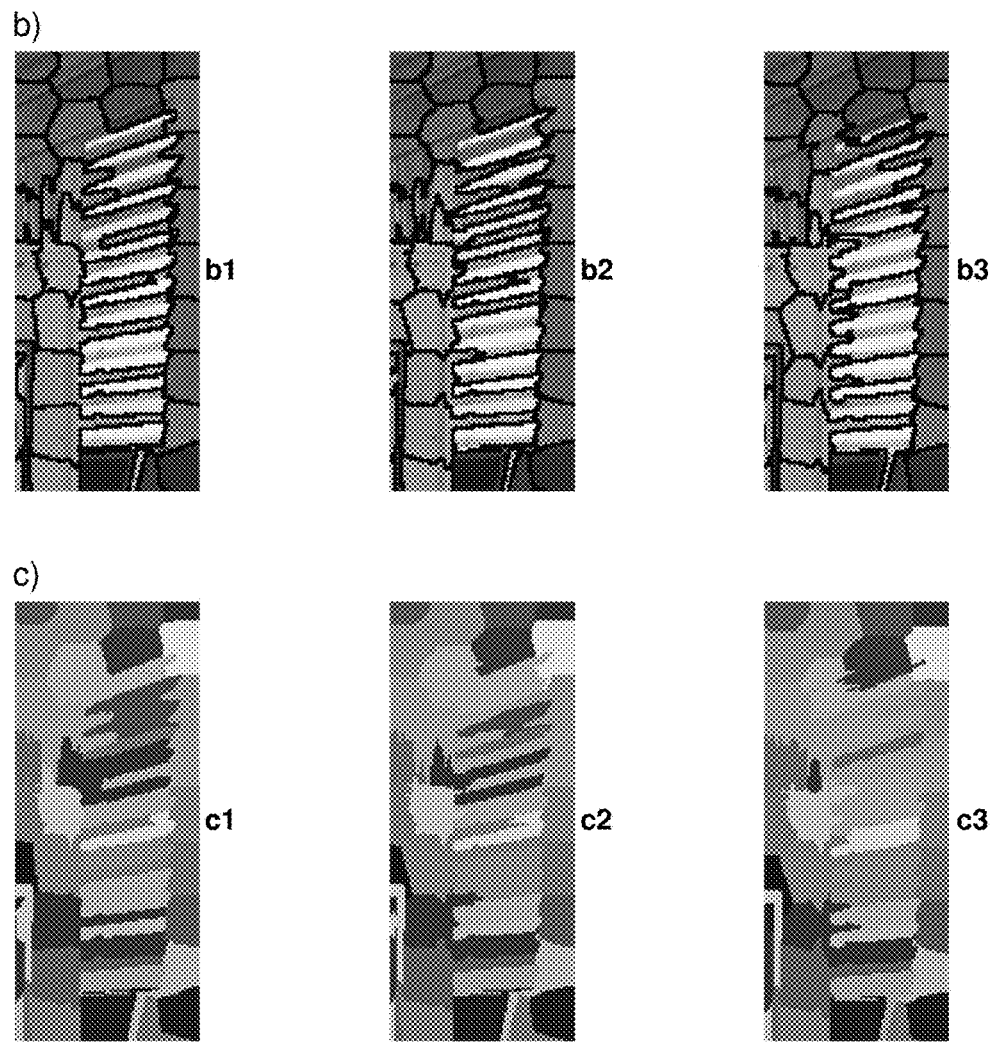
FIG. 2 shows enlarged views of the highlighted areas of FIG. 1.

The above described solution sometimes creates violations for the underlying model of the abstraction layer. FIG. 2 shows enlarged views of the highlighted areas of FIGS. 1b) and c). As can be seen, the application of the unmodified algorithm leads to shape oscillations generated for superpixels located in static background. A small change of ±1 pixels for the seed point location causes large changes for the resulting superpixel shape.

Figure 4:
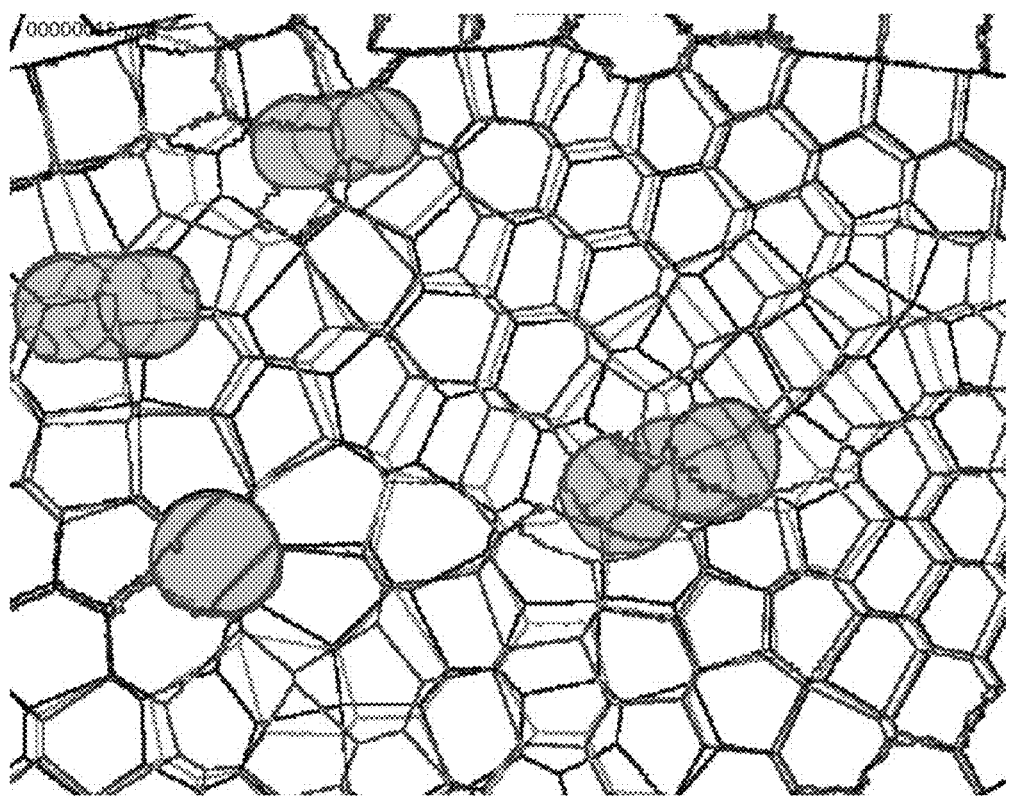
FIG. 4 shows a superposition of the superpixel maps of FIG. 3c)
Figure 5:
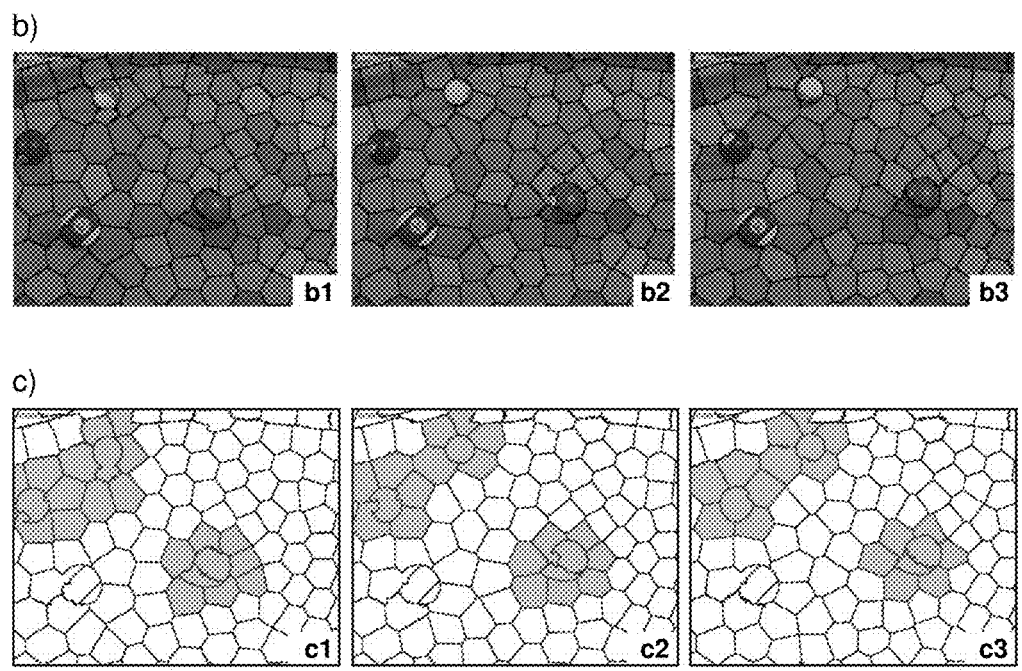
FIG. 5 illustrates the determination of mutable superpixels for an image sequence containing static and dynamic image areas, FIG. 6 schematically shows a method according to the invention for generating superpixels.

FIG. 4 demonstrates the effect of pseudo motion for superpixels generated with the unmodified algorithm. In this figure the three superpixel maps taken from FIG. 3c) are superimposed. The superpixels marked in grey cover the moving billiard balls, while the remaining superpixels belong to the static background. As can be seen in the figure, the superpixels in the background are moving and seem to be attracted or being pulled by the moving object superpixels.

In order to cope with the above problems, the spatio-temporal over-segmentation algorithm is modified. For this purpose a mask is generated based on the frame to frame motion vectors estimates. The mask describes the image areas containing mutable and immutable superpixels. Seed points locations marked as mutable in the mask are modified according the resulting motion vectors. Seed point locations marked as immutable in the mask are frozen and their location is not modified for the new superpixel calculation.

For generating the mask, static and non-static image areas are determined by analyzing the absolute motion vector mean values $V_m(i)=\|\vec{v}\|(i)$ and their variances $\Sigma(i)=\sigma_{\|\vec{v}\|}(i)$ within each superpixel i, comparing the resulting mean values $V_m(i)$ against a threshold $\alpha_1$, comparing the variances $\Sigma(i)$ against a threshold $\alpha_2$, setting the superpixel area as immutable if $V_m(i)<\alpha_1$ and if $\Sigma(i)<\alpha_2$, and as mutable if either $V_m(i)\geq\alpha_1$ or $\Sigma(i)\geq\alpha_2$. The variance measure serves as a confidence indicator for the motion vector reliability within the superpixel, which may cover object borders and/or occluded as well as non-occluded image areas.

The above approach may be further sophisticated with regard to the determination of static and non-static image areas. To this end additionally the directed mean values of the motion vector field divergence values $m_{div}(i)=\vec{\nabla}\cdot\vec{v}(i)$ and the mean motion vector field rotation values $m_{rot}(i)=\vec{\nabla}\cdot\vec{v}(i)$ within each superpixel i are analyzed. Superpixel areas marked as immutable by the previous approach are then switched to mutable if $m_{rot}(i)<\beta_1$ and $m_{div}(i)>\beta_2$. Both criteria, i.e. the shortfall and exceeding of thresholds $\beta_1$ and $\beta_2$, respectively, indicate a vortex free sink or source in the motion vector field created by scene objects moving orthogonally to the camera image plane.

The threshold $\alpha_1$ is advantageously determined by analyzing all superpixels present in the frame and averaging their superpixel size, which provides an average pixel count APC in pixels. From this a virtual superpixel is determined, either assuming a circular shape or assuming a rectangular shape. The threshold $\alpha_1$ is then derived by $\alpha_{1,circ}=\sqrt{\tau^2/\pi\cdot APC}$ for the circular and $\alpha_{1,rect}=\sqrt{\tau^2\cdot APC}$ for the rectangular shape, where $\tau\geq 0$ is used to tune the selectivity between static and non-static superpixel areas in the image.

Preferably, the immutable superpixels adjacent to static superpixel areas are analyzed and the mutable mask is widened, i.e. the number of mutable superpixels is enlarged, in dependence on the motion vectors found within the mutable superpixels. This is performed, for example, by modifying first or higher order adjacent superpixel segments depending on the undirected mean motion vector magnitude $V_m(i) = \|\vec{v}\|(i)$ and the superpixel area, i.e. the pixel count.

Alternatively or in addition, the extent of immutable neighbors being set to mutable is modified with respect to occluded and non-occluded areas by analyzing the directed mean motion vector value $\vec{V_m}(i) = (\nabla_x, \nabla_y)^T$. The neighboring superpixel segments being set to mutable are tightened when they are located orthogonal to the motion direction of $\vec{V_m}(i)$. The mutable superpixel segments are widened when they are located in the direction of the superpixel motion $\vec{V_m}(i)$ with respect to the superpixel extension, i.e. the respective pixel count.

Favorably, only the superpixel seed points belonging to the immutable superpixel mask are frozen, while the segmentation algorithm is nonetheless applied to all pixels.

Alternatively, the superpixel seed points and the pixels associated to immutable superpixels are frozen and the segmentation algorithm is applied to pixels associated to mutable superpixels only.

According to a further approach, the two above solutions can be combined. For this purpose for superpixels located in occluded or un-occluded image areas only the superpixel seed points belonging to the immutable superpixel mask are frozen, while the segmentation algorithm is nonetheless applied to all superpixels. For static image areas the superpixel seed points and superpixel area pixels masked as immutable are frozen and the segmentation algorithm is applied to mutable pixels only.

Figure 6:
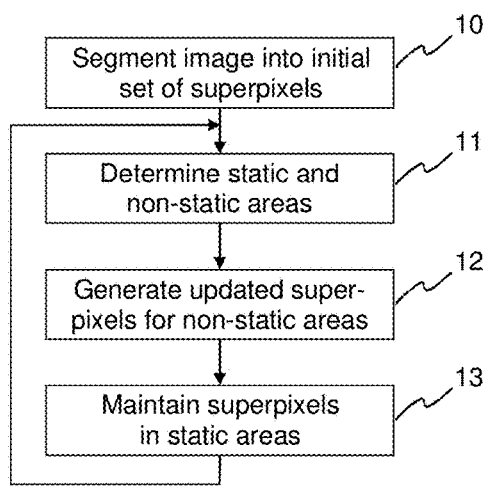

A method according to the invention for generating superpixels for a sequence of images is schematically shown in FIG. 6. In a first step an image of the sequence of images is segmented 10 into a set of initial superpixels. Then static and non-static areas in the sequence of images are determined 11. Subsequently, for non-static areas of the sequence of images updated superpixels are generated 12, whereas those superpixels of the set of initial superpixels belonging to static areas of the sequence of images are maintained 13.

Figure 7:
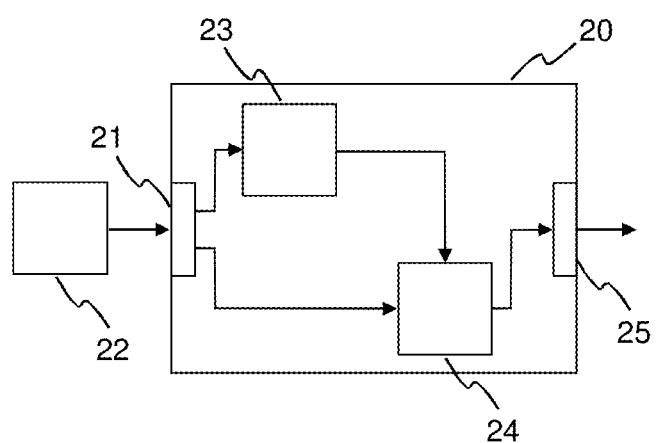
FIG. 7 illustrates an apparatus adapted to implement a solution according to the invention for generating superpixels.

FIG. 7 schematically illustrates an apparatus 20 adapted to implement a solution according to the invention for generating superpixels for a sequence of images. The apparatus 20 has an input 21 for receiving a sequence of images, e.g. from a network or a local storage 22. A segmenter 24 segments 10 an image of the sequence of images into a set of initial superpixels. A motion analyzer 23 then determines 11 static and non-static areas in the sequence of images. Based on the output of the motion analyzer 23 the segmenter 24 generates 12 updated superpixels for non-static areas of the sequence of images, and maintains 13 those superpixels of the set of initial superpixels belonging to static areas of the sequence of images. Of course, the initial set of superpixels may likewise be retrieved from a different source, e.g. an additional segmenter. The resulting superpixels are preferably made available for further processing via an output 25. Of course, the different units 23, 24, may likewise be fully or partially combined into a single unit or implemented as software running on a processor. In addition, the input 21 and the output 25 may likewise be combined or partially combined into a single bi-directional interface.

The invention claimed is:

1. A method for generating superpixels for a sequence of images, the method comprising:
   segmenting an image of the sequence of images into a set of initial superpixels;
   determining static and non-static areas in the sequence of images by analyzing motion vector means values and their variances within each superpixel;
   generating updated superpixels for non-static areas of the sequence of images; and
   maintaining those superpixels of the set of initial superpixels belonging to static areas of the sequence of images;
   wherein a superpixel is set as immutable if the motion vector mean value is smaller than a first determined value and the variance is smaller than a second determined value, and as mutable else, a superpixel marked as immutable being set to mutable if a directed mean value of a motion vector field divergence value is smaller than a third determined value and a mean motion vector field rotation value within said superpixel is larger than a fourth determined value.

2. The method according to claim 1, wherein the first threshold is determined from an average size of the superpixels of an image.

3. The method according to claim 1, wherein the first determined value is determined from an average superpixel size determined by analyzing all superpixels present in an image.

4. The method according to claim 1, wherein immutable superpixels adjacent to superpixels in static areas are analyzed and the number of mutable superpixels is enlarged in dependence on motion vectors found within the mutable superpixels.

5. The method according to claim 1, wherein only superpixel seed points belonging to immutable superpixels are frozen, while the segmenting is applied to all superpixels.

6. The method according to claim 1, wherein superpixel seed points and pixels of immutable superpixels are frozen and the segmenting is applied to pixels of mutable superpixels only.

7. An apparatus configured to generate superpixels for a sequence of images, the apparatus comprising:
   a motion analyzer configured to determine static and non-static areas in the sequence of images by analyzing absolute motion vector mean values and their variances within each superpixel; and
   a segmenter configured to segment an image of the sequence of images into a set of initial superpixels, generate updated superpixels for non-static areas of the sequence of images, and maintain those superpixels of the set of initial superpixels belonging to static areas of the sequence of images;
   wherein a superpixel is set as immutable if the motion vector mean value is smaller than a first determined value and the variance is smaller than a second determined value, and as mutable else, a superpixel marked as immutable being set to mutable if a directed mean value of a motion vector field divergence value is smaller than a third determined value and a mean motion vector field rotation value within said superpixel is larger than a fourth determined value.

8. The apparatus according to claim 7, wherein the segmenter is configured to determine the first determined value from an average size of the superpixels of an image.

9. The apparatus according to claim 7, wherein the segmenter is configured to determine the first determined value from an average superpixel size determined by analyzing all superpixels present in an image.

10. The apparatus according to claim 7, wherein the segmenter is configured to analyze immutable superpixels adjacent to superpixels in static areas and to enlarge the number of mutable superpixels in dependence on motion vectors found within the mutable superpixels.

11. The apparatus according to claim 7, wherein the segmenter is configured to freeze only superpixel seed points belonging to immutable superpixels, but to apply the segmenting to all superpixels.

12. The apparatus according to claim 7, wherein the segmenter is configured to freeze superpixel seed points and pixels of immutable superpixels and to apply the segmenting to pixels of mutable superpixels only.

13. A non-transitory computer readable storage medium having stored therein instructions enabling generating superpixels for a sequence of images, which when executed by a computer, cause the computer to:
- segment an image of the sequence of images into a set of initial superpixels;
- determine static and non-static areas in the sequence of images by analyzing absolute motion vector mean values and their variances within each superpixel;
- generate updated superpixels for non-static areas of the sequence of images; and
- maintain those superpixels of the set of initial superpixels belonging to static areas of the sequence of images;

wherein a superpixel is set as immutable if the motion vector mean value is smaller than a first determined value and the variance is smaller than a second determined value, and as mutable else, a superpixel marked as immutable being set to mutable if a directed mean value of a motion vector field divergence value is smaller than a third determined value and a mean motion vector field rotation value within said superpixel is larger than a fourth determined value.

14. The non-transitory computer readable storage medium according to claim 13, wherein the instructions cause the computer to determine the first determined value from an average size of the superpixels of an image.

15. The non-transitory computer readable storage medium according to claim 13, wherein the instructions cause the computer to determine the first determined value from an average superpixel size determined by analyzing all superpixels present in an image.

16. The non-transitory computer readable storage medium according to claim 13, wherein the instructions cause the computer to analyze immutable superpixels adjacent to superpixels in static areas and to enlarge the number of mutable superpixels in dependence on motion vectors found within the mutable superpixels.

17. The non-transitory computer readable storage medium according to claim 13, wherein the instructions cause the computer to freeze only superpixel seed points belonging to immutable superpixels, but to apply the segmenting to all superpixels.

18. The non-transitory computer readable storage medium according to claim 13, wherein the instructions cause the computer to freeze superpixel seed points and pixels of immutable superpixels and to apply the segmenting to pixels of mutable superpixels only.

* * * * *